(12) United States Patent  (10) Patent No.: US 7,545,571 B2
Garoutte et al.  (45) Date of Patent: Jun. 9, 2009

(54) WEARABLE DISPLAY SYSTEM (75) Inventors: John Garoutte, Port Orchard, WA (US); David Bajorins, Kirkland, WA (US); Chris Gnehm, Bremerton, WA (US)

(73) Assignee: Concurrent Technologies Corporation, Johnstown, PA (US)

( * ) Notice: Subject to any disclaimer, the term of this patent is extended or adjusted under 35 U.S.C. 154(b) by 216 days.

(21) Appl. No.: 11/221,268

(22) Filed: Sep. 7, 2005

(65) Prior Publication Data
US 2006/0098293 A1   May 11, 2006

Related U.S. Application Data (60) Provisional application No. 60/608,406, filed on Sep. 8, 2004.

(51) Int. Cl.
*G02B 27/14* (2006.01)
*G02B 5/30* (2006.01)
*G09G 5/00* (2006.01)

(52) U.S. Cl. .................. 359/630; 359/631; 359/486; 345/7; 345/8

(58) Field of Classification Search .......... 359/630, 359/631, 633, 629, 486, 487, 488; 345/7, 345/8
See application file for complete search history.

(56) References Cited

U.S. PATENT DOCUMENTS

| | | | |
|---|---|---|---|
| 5,808,801 A * | 9/1998 | Nakayama et al. | 359/630 |
| 6,208,463 B1 | 3/2001 | Hansen et al. | |
| 6,693,749 B2 * | 2/2004 | King et al. | 359/630 |
| 6,882,479 B2 | 4/2005 | Song et al. | |
| 6,903,875 B2 | 6/2005 | Achtner | |
| 6,914,726 B2 | 7/2005 | Kasai | |
| 7,230,766 B2 * | 6/2007 | Rogers | 359/630 |

* cited by examiner

*Primary Examiner*—William C Choi
*Assistant Examiner*—Jack Dinh
(74) *Attorney, Agent, or Firm*—Buchanan Ingersoll & Rooney PC (57) ABSTRACT

A wearable display system, such as a Head Mounted Display, having a display engine producing light, preferably linearly polarized light, which defines a synthetic image that is relayed to a wire grid polarizing combiner which overlays the synthetic image onto a real image of an object of the outside world, and wherein the real image is contemporaneously viewed through the wire grid polarizing combiner by the wearer of the system. The wire grid polarizing combiner can be curved in at least one axis, and preferably two axis such that optical power is added to the wire grid polarizing combiner.

46 Claims, 5 Drawing Sheets

WEARABLE DISPLAY SYSTEM

CROSS-REFERENCE TO RELATED APPLICATION

This application claims priority to U.S. Provisional Patent Application Ser. No. 60/608,406, filed Sep. 8, 2004.

FIELD OF THE INVENTION

The invention relates to wearable display systems, such as a Head Mounted Display, and more particularly to a Head Mounted Display having wire grid polarizing combiner which combines a synthetic image with a contemporaneously viewed real image.

BACKGROUND OF THE INVENTION

Wearable display systems, and particularly Head Mounted Display (HMD) systems, are well known in the art. HMDs have been conceptualized and manufactured for over 40 years. The first HMD was constructed in the 1960's by Ivan Sutherland. Since Sutherland's 40 pound monochrome HMD, great strides have been made in the field. Most modern augmented-vision HMDs use three general techniques for overlaying information onto an outside real-world environment (augmenting reality or vision). The first technique combines visual data with the outside world utilizing a metalized glass "combiner" optic. This combiner has a very thin layer of metal (usually aluminum), placed over a piece of glass to create a partially slivered mirror. An image is then reflected off this partial mirror and into the users visual field of view. Because of the nature of the mirror, the user is still able to view the outside environment, although somewhat attenuated. This mirror can be curved or flat depending on the particular optical design.

Metalized combiners are among the most robust and versatile combiners. They offer uniform broadband reflectance allowing full color augmented vision. However, they are limited by the very basic physics of reflection and transmission. The portion of transmitted see-through light and the portion of reflected display light must equal 100%. Therefore, if 99% of the light from the outside world reaches the user, only 1% of the total display light will be reflected towards the user. This necessitates the use of a very bright and power hungry display. This general principle makes metalized combiner HMDs impractical for many demanding applications where lightweight, low power devices are required.

Other combining techniques include thin film coatings and Holographic Optical Elements (HOEs). Both of these techniques operate on the principle of reflecting very narrow and specific colors of light to the user's visual field of view. In an optical design these combiners function in a similar manner as metalized combiners. These selective wavelength combiners take a monochromatic light source and direct it to the users visual field of view while letting other colors from the outside environment pass onto the user. If full color augmentation is desired, then three layers of either thin film stacks or three layers of HOEs are required.

Most Military grade HMDs use a thin film coating type of combiner. This type of combiner offers a high degree of see-through vision with a highly reflective monochrome display. The main disadvantage of this type of combiner is that it only works well with narrow band sources, e.g., lasers, or green phosphor CRTs. If full color augmented vision is required, then three narrow band laser sources are needed. These are typically expensive and consume a lot of power. Moreover, even with expensive narrow band reflective coatings, there will still be a noticeable loss of see-through light. There are also other practical considerations such as only having specific angles of incidence over which the coatings will function properly, sometimes as small as +/−5 degrees.

Holographic combiners are plagued by many of the same disadvantages as thin film coatings. Besides being extremely sensitive to color and display light angle of incidents, holographic combiners can also be extremely susceptible to large changes in temperature.

Wire-grid polarizers are also well known in the art. The fist wire-grid polarizer was developed in 1960 by George R. Bird and Maxfield Parrish. However, these polarizers were only for infrared wavelengths. More recently, others have pioneered the use of wire-grid polarizers in the visible spectrum. Wire-grid polarizers are optical elements which work on the principle of transmitting and reflecting linearly polarized light based on its orientation to the wire-grid. Linearly polarized light which is perpendicular to the wire-grid is passed. Linearly polarized light which is parallel to the wire-grid is reflected. These polarizers can reflect over 90% of the polarized light over a large visible spectrum and with angles of incidence greater than +/−20 degrees. One company which presently makes wire grid polarizers for uses in the visible spectrum is Moxtek, Inc., which is also the assignee of U.S. Pat. No. 6,208,463, for a Polarizer Apparatus for Producing a Generally Polarized Beam of Light.

Liquid Crystal on Silicon (LCoS) displays are known in the art, and work by using both pixel by pixel polarization modulation and field sequential color modulation. LCoS displays require linearly polarized light input. Conventionally, wire-grid polarizers have been used with LCoS displays to linearly polarize light before interaction with the LCoS display. It is also known for wire grid polarizers to occasionally be used as a contrast enhancing, or "clean up," polarizer located after the LCoS display, prior to projecting or viewing the image.

SUMMARY

According to the invention, a wearable display system, such as an HMD, is provided for augmenting a contemporaneously viewed "real image" of an object in the outside world with a synthetic image using a wire grid polarizing combiner. One embodiment the HMD can comprise a display engine which produces linearly polarized light defining the synthetic image, a light engine which produces light to illuminate the display engine, a polarizing beamsplitter in the path of the light produced by the light engine, wherein the polarizing beamsplitter polarizes at least a portion of the light from the light engine and reflects the polarized portion of light onto the display engine, enabling the display engine to produce the linearly polarized light defining the synthetic image, display optics in the path of the linearly polarized light defining the synthetic image, and a wire grid polarizing combiner through which the real image is contemporaneously viewable. The display optics relay the linearly polarized light to the wire grid polarizing combiner, and the wire grid polarizing combiner reflects the linearly polarized light such that the synthetic image is overlaid onto the contemporaneously viewable real image. Illumination optics can also be provided to concentrate and direct the unpolarized light from the light engine to the polarizing beamsplitter which reflects the polarized light onto the display engine which produces polarized, spatially and temporally modulated light representative of the synthetic image, which is relayed by the display optics to the wire grid polarizing combiner where it is reflected toward the pupil of the eye of the wearer of the HMD. The wire-grid polarizing combiner reflects the synthetic image into the eye while allowing light and images from the outside world, i.e., real images, to also be contemporaneously imaged by the eye thereby "combining" (basically overlaying) the synthetic and real images.

The wire grid polarizing combiner can be curved in at least one axis, and preferably in two axes such that optical power is added to the wire grid polarizing combiner. The dual axis curved wire grid combiner can have the shape of a concentric shell section of a toroid. The dual axis curved combiner can offer advantages over a flat combiner. One advantage of the curved combiner embodiment is that the powered optical element is close to the eye enabling dramatically larger fields of view. Another advantage is that the curved combiner may also result in concentrating more light at the pupil of the user, creating a brighter image. Where a dual axis curved wire grid polarizing combiner is utilized, complimentary designed display optics can be provided which include image aberration correction optics to correct image aberrations which result from the dual axis curvature of the combiner.

Another embodiment of the HMD can employ a display engine which included integral illuminate, and thus does not require the light engine or illumination optics. Linearly polarized light is not required for the wire grid polarizing combiner to function, but is preferable to avoid transmission of light by the wire grid polarizer which could make the HMD undesirably visible. Thus, display engines which produce linearly polarized light could be used which further obviates the need for a polarizer, making the polarizing beamsplitter unnecessary. On the other hand, display engines which have integral illumination but do not produce linearly polarized light could be used alone, but would preferably be used in combination with a polarizer to linearly polarize the light produced thereby such that only linearly polarized light is presented to the wire grid polarizing combiner.

Further details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawing figures, wherein.

DETAILED DESCRIPTION OF CERTAIN EMBODIMENTS

Figure 1:
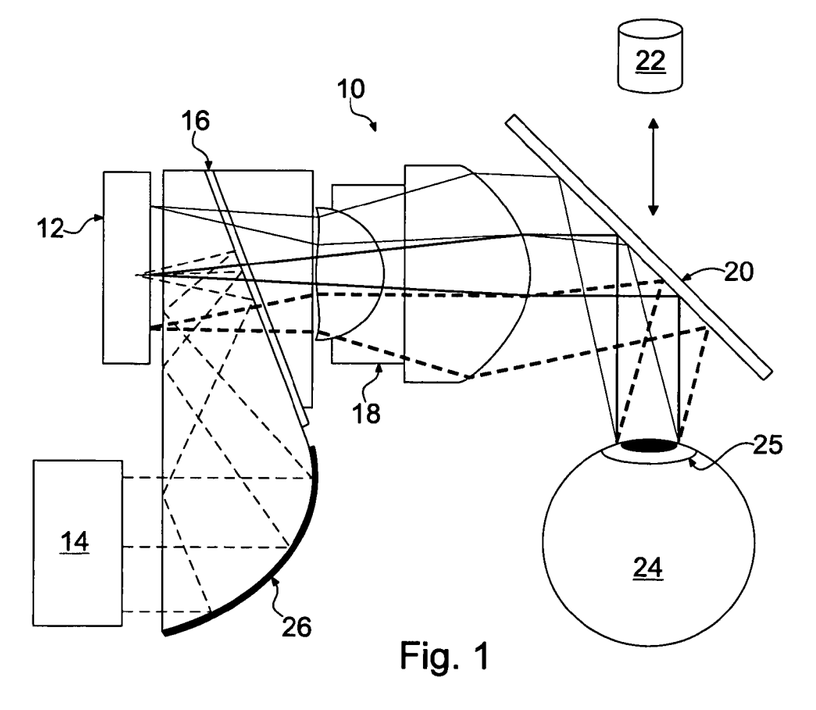
FIG. 1 is a diagram of an embodiment of a wearable display system according to the invention.

Referring now to the drawing figures, wherein like elements are denoted by like reference numbers, there is illustrated in FIG. 1 an embodiment of a wearable display system, such as a Head Mounted Display (HMD) 10, which combines a synthetic image with a contemporaneously viewable "real image" of the outside world. As shown, the HMD 10 can comprise a display engine 12 which produces linearly polarized light defining the synthetic image, a light engine 14 which produces light (typically unpolarized) to illuminate the display engine 12, a polarizing beamsplitter 16 in the path of the light produced by the light engine 14 which polarizes at least a portion of the light from the light engine 14 and reflects the polarized portion of light onto the display engine 12 (enabling the display engine 12 to produce the linearly polarized light defining the synthetic image), display optics 18 in the path of the linearly polarized light defining the synthetic image, and a wire grid polarizing combiner 20 through which the real image 22 is contemporaneously viewable. The display optics 18 relay the linearly polarized light to the wire grid polarizing combiner 20, and the wire grid polarizing combiner 20 reflects the linearly polarized light to the eye 24 of the user, such that the synthetic image is overlaid onto the contemporaneously viewable real image of object 22 in the outside world. In the context of this disclosure, the "real image" refers to an image of objects, e.g., object 22, in the "outside world," as viewed by the wearer of the HMD 10 through the polarizing combiner 20. The display optics 18, also sometimes referred to as an eyepiece, typically include image enlargement optics which magnify the synthetic image produced by the display engine 12. One such eyepiece, a magnifier, which can be used is commonly referred to as an apochromatic eyepiece. The display optics 18 can generally be complicated, compact versions of a simple magnifier. The display optics 18 are a type of magnifier (eyepiece) typically designed for color correction and shorter focal lengths.

Illumination optics 26 can be provided to concentrate and direct the unpolarized light from the light engine 12 to the polarizing beamsplitter 16. The light polarized by the polarizing beamsplitter 16 is reflected onto the display engine 12 to produce polarized, spatially and temporally modulated light which is representative of (defines) the synthetic image which is relayed by the display optics 18 into the wire grid polarizing combiner 20 which reflects the image toward the pupil 25 of the eye 24 of the wearer of the HMD. The wire-grid polarizing combiner 20 reflects the synthetic image into the eye 24 while also allowing light and images from the outside world, i.e., real images 22, to be contemporaneously imaged by the eye 24 thereby "combining" (basically overlaying) the synthetic image onto the real image 22.

The display engine 12 can preferably be an LCoS display, although other display engines, producing either polarized or unpolarized light may also be used. In various embodiments of the HMDs described hereinafter, the display engine 12 can alternatively be, for example, LCD, OLED, and MEMS displays. However, an LCoS display is presently preferred as it produces and reflects a full color, linearly polarized image. According to the invention, the wire-grid polarizing combiner 20 is utilized as a light combiner, i.e.; combining the light from an outside image (the real image 22) with the LCoS display light (the virtual image) to produce a full color augmented display with the virtual image overlaid on the real image 22. When the wire grid polarizer 20 is mounted external to the other optics the users' natural full field of view is not impinged upon. This allows the use of the HMD 10 in demanding tactical environments where situational awareness of the real world is vastly more important than overlaid synthetic information.

The LCoS display requires linearly polarized light input, which is spatially and temporally modulated by the LCoS display to produce the linearly polarized light which defines the synthetic image. Thus, the light engine 14 can be necessary to provide light to illuminate the display engine 12, and the polarizing beamsplitter 16 can be necessary to linearly polarize the light from the light engine 14 and reflect the polarized light onto the display engine 12. The polarizing beamsplitter converts about 50% of the unpolarized light to linearly polarized light. The polarized, spatially and temporally modulated light produced by the display engine, e.g., the LCoS display, can then be relayed to the wire grid polarizing combiner 20 by virtually any appropriately designed display optics, such as display optics 18. The polarizing beamsplitter 16 can preferably be a wire grid polarizing beamsplitter. Wire grid polarizers have nearly perfect broad spectrum transmission (98%) and large angles of incidence (+/−20 degrees). This is achieved while reflecting over 90% of the linearly polarized light from the display to the user. Because the wire grid polarizing combiner 20 depends on polarization for its transmission and reflection characteristics, and not very narrow bands of light, broad sources such as LEDs can be used. This gives the advantage of not only having a bright overlay image, but also much less power consumption.

The linearly polarized light from the display engine 12 is preferably colored light, such as the modulated field sequential colored light produced by the LCoS. However, the linearly polarized light could also be monochrome. The light engine 14 can include both coherent and incoherent sources, such as, for example, LEDs, a laser source, an incandescent source, or a fluorescent source. If incandescent or fluorescent light sources are used, a color wheel can be necessary to produce field sequential colored light.

The wire grid polarizing combiner 20 is essentially transparent to the user, in that the wearer of the system can view real images of, for example, an object 22, of the outside world by looking through the wire grid polarizing combiner 20. However, the wire grid polarizing combiner 20 substantially entirely reflects linearly polarized light relayed through the display optics 18 which is representative of the synthetic image. Substantially all of the linearly polarized light is reflected by the wire grid polarizing combiner 20, resulting in displaying a bright, high quality synthetic image to the eye 24 of the wearer. This synthetic image basically augments the real image, e.g., of object 22, in that the synthetic image reflected by the wire grid polarizing combiner 20 appears to overlay the contemporaneously viewed real image of object 22 of the outside world. Thus, as real images are being viewed through the wire grid polarizing combiner 20, the synthetic image augments the real images. The wire grid polarizing combiner 20 can be flat, curved in a single axis, or curved in more than one axis. As will be described in more detail hereinafter, a preferred embodiment of the wire grid polarizing combiner 22 can be curved in two axis, having the shape of a concentric shell section of a toroid.

Figure 2:
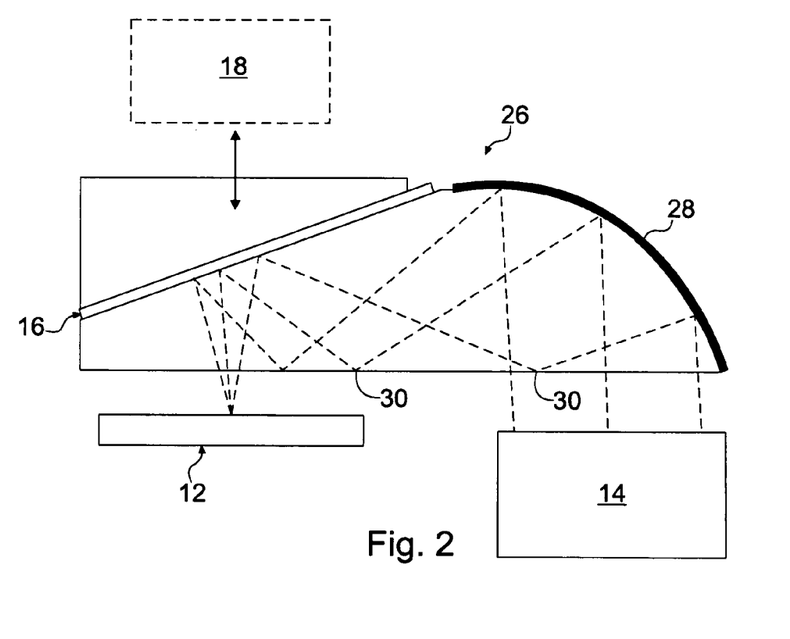
FIG. 2 is a diagram of an embodiment of illumination optics according to the invention.

Referring more particularly to FIG. 2, in order to direct and concentrate the light from the light engine 14 on the display engine 12, or more particularly the polarizing beamsplitter 16, illumination optics 26 are provided in the light path between the light engine 14 and the polarizing beamsplitter 16. As shown, a preferred embodiment of the illumination optics 26 can direct and concentrate light from the light engine 14 onto the polarizing beamsplitter 16. To concentrate the light, the illumination 26 optics can comprise a total internal reflection (TIR) block which gathers and concentrates the light from the light engine 14 onto the polarizing beamsplitter 16. The TIR block can have a reflective, e.g., mirrored, off-axis parabola portion 28 positioned opposite the light engine 14, and a reflective TIR surface 30 opposite the reflective off-axis parabola portion 28. Light from the light engine 14 impinges on the mirrored off-axis parabola portion 28 which concentrates and reflects the light onto the opposite TIR surface 30. The opposite TIR surface 30 then totally internally reflects the concentrated light onto the polarizing beamsplitter 16, which linearly polarizes at least a portion (about 50%) of the light and reflects such polarized portion onto the display engine 12. In this way, substantially the total amount of light from the light engine 14 is internally reflected onto the polarizing beamsplitter 16.

Figure 3:
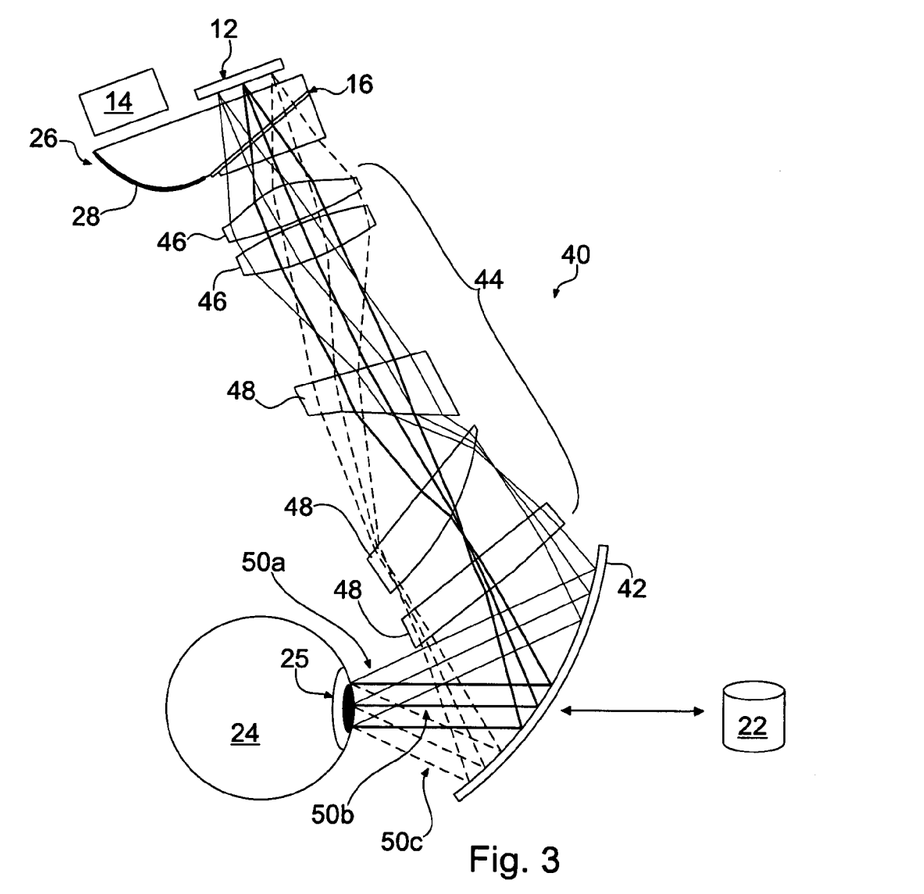
FIG. 3 is a diagram of an alternative embodiment of a wearable display system according to the invention.

Referring now to FIG. 3, an alternative embodiment of a wearable display system, such as a HMD 40, is illustrated which includes the display engine 12, light engine 14, and illumination optics 26 described in connection with the HMD 10 shown in FIG. 1. However, the HMD 40 can further comprise a curved wire grid polarizing combiner 42, preferably a dual axis curved combiner, and different display optics 44 specially designed for use with the dual axis curved combiner 42.

The dual axis curved combiner 42 can have important advantages, including enablement of a dramatically larger field of view, as much as 65 percent larger than with a flat wire grid polarizing combiner. Another advantage is that the dual axes curvature can also result in a higher degree of light being concentrated on the pupil 25 of the eye 24 of the user, thus providing improved image brightness.

In general, display optics are employed to magnify the image produced by a display engine. This could be as simple as placing a single positive lens over the display, such as a liquid crystal display. Image magnification and image "quality" are the two main factors by which HMD optics are judged. In the context of HMDs, the best definition of magnification (M) is the ratio of the angle ($\alpha 1$) between the unaided eye and the display, and the angle ($\alpha 2$) between the aided eye and the image produced by the display, or M=$\alpha 2$/$\alpha 1$. This is also equal to the eyes "near distance" (254 mm) divided by the lens focal length. The angle $\alpha 2$ is also referred to as the field of view of the HMD. The more "immersive" the HMD, the larger the field of view. One well known limitation as to how large $\alpha 2$ can be is called the "eye relief," which is a function of the size of the lens and the distance between the eye and the last optical element. In an occluded HMD this is not as much of an issue because the user only needs to look at the lens, and not through a combiner first, as with an augmented HMD. In an augmented HMD, i.e., where a synthetic image augments (is overlaid onto) the real image, such as, for example, the HMD 10 illustrated in FIG. 1, the user must look through the wire grid polarizing combiner 12 and then to the image enlargement optics (display optics 18), i.e., the magnifier. In this type of configuration, the potential field of view will necessarily be limited, that is unless the first component in the magnifier is the wire grid polarizing combiner itself, and thus the first display optics element. Thus, by curving the wire grid polarizing combiner 42 as described, optical power has been added to the polarizing combiner 42 itself, such that the polarizing combiner 42 becomes a magnifier, and particularly, the first component of the magnifier.

The addition of optical power to the polarizing combiner 42, and since the polarizing combiner 42 is positioned immediately adjacent the eye 24 of the user (no other optical elements are between the user's eye and the combiner), dramatically larger fields of view are enabled. In order to be able to position such a large optically powered element so close to the eye 24 of the user, a reflective off-axis element can be necessary, i.e., the dual axis curvature. In a preferred embodiment, the optically powered dual axis wire grid polarizing combiner 42 can be in the shape of a concentric shell section of a toroid, having a conic surface profile known in the art as a bi-conic surface. This bi-conic surface can be defined by an X radius of −40 mm with a conic constant of 0.26, and a Y radius of −60 mm with a conic constant of 0.18. The concentric shell section is a 48 mm (x) by 28 mm (y) section, and is 23 mm off-axis in (y). A result of the dual axis curvature as described is that, as one skilled in the art will understand, such an off-axis section will result in the combiner 42 producing significant amounts of image aberrations which will need to be corrected by other optical elements.

Accordingly, to accommodate the dual axis curved combiner 42, specially designed display optics 44 can be provided. In particular, the display optics 44 can comprise image aberration correction optics designed to be used specifically with the dual axis curved combiner 42. Unlike the previous embodiment of the HMD 10, the image enlargement function is performed by the dual axis curved combiner 42 and the optics 44. The optics 44 are necessary to correct the image aberrations referred to above which are caused by the dual axis curvature of the wire grid polarizing combiner 42.

Figure 4:
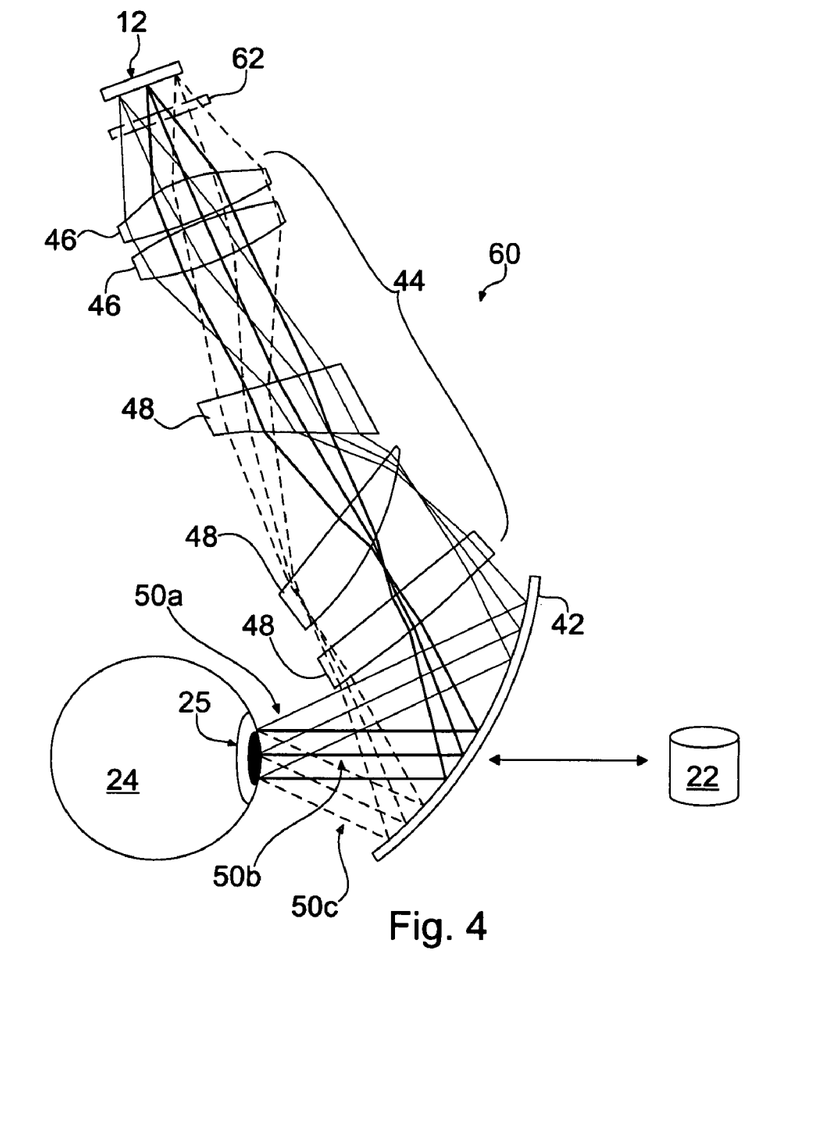
FIG. 4 is a diagram of another alternative embodiment of a wearable display system according to the invention.

Referring still to FIG. 3, and as also shown in FIG. 4, the image aberration correction is accomplished by overall lens grouping 44 (the display optics), which is comprised of tilted and decentered lenses 48 and rotational symmetric aspherical lenses 46. Working from the display engine 12 toward the curved combiner 42, the synthetic image produced by the display engine 12 is relayed by lens sub-group 46 into lens sub-group 48. Lens sub-group 48 "pre-distorts" the synthetic image which is presented to the curved combiner 42. The curved combiner 42, in collaboration with overall lens grouping 44, provides the user with a well corrected, highly magnified image from the display engine 12 over a large field of view. The optical power and aberrations created by the dual axis curved combiner 42 are thus an integral part of the optical design of the HMD 40, and particularly the image aberration correction lens group 44. Together the dual axis curved combiner 42 and image aberration correction lens group 44 form high magnification display optics.

The light rays denoted by arrows 50a, 50b, 50c represent different field angles which "see" different parts of the display. As with the polarizing wire grid combiner 20 in FIG. 1, only linearly polarized light parallel to the wire grid is reflected, thus allowing the randomly polarized light from the outside environment, i.e., the real image 22, to be seen by the user through the combiner 42, thus providing "augmented" vision.

One skilled in the art will realize that lens position and form are optimized around standard image quality merits, such as, for example, Seidel aberration content over the visual spectrum and the optical system modulation transfer function over field and wavelength. Conventional optics design software is also available to assist in the design of optics such as used in HMDs. One example of such software is ZEMAX™, which is available from Zemax Development Corporation.

In FIG. 4, a further embodiment of an HMD 60 is illustrated which can basically be include the same components as the HMD 40 in FIG. 3, minus the light engine 14, illumination optics 26 and the polarizing beamsplitter 16. In the HMD 60, light produced by the display engine 12 (defining the synthetic image) is relayed to the curved wire grid polarizing combiner 42 by display optics. The wire grid polarizing combiner 42 is preferably curved in two axis, having the shape of a concentric shell section of a toroid as described previously. The display optics 44 can also be the same as for the HMD 40 in FIG. 3, including being comprised of image aberration correction optics to correct for image aberrations caused by the off-axis section of the dual axis curved combiner 42. The image aberration correction optics can comprise the same overall lens group 44, which includes tilted and decentered lenses 48 and rotational symmetric aspherical lenses 46.

The light produced by the display engine 12 which defines the synthetic image does not have to be linearly polarized light. However, as will be explained below, presenting linearly polarized light to the curved wire grid polarizing combiner 42 can be preferred. A back illuminated LCD display could be used with the HMD 60, since this type of display engine produces linearly polarized light and does not require a separate light engine. As suggested by the name, the back illuminated LCD display includes an integral light source. Examples of such LCD displays include the displays on cell phones and digital cameras.

Another type of display engine which does not require a separate light engine is for example, an organic light emitting diode (OLED) display. However, an OLED display generally does not produce linearly polarized light. As stated above, linearly polarized light is not required for the HMD 60 to function, but it can be preferable to present the wire grid polarizing combiner 42 with linearly polarized light. A wire grid polarizer reflects and transmits linearly polarized light regardless of the light which is presented to it. If a wire grid polarizer is presented with linearly polarized light having an electric field perpendicular to the wires (the transmission axis) that make up the wire grid, then substantially all of the light will be transmitted, subject to the efficiency limits of the wire grid polarizer. On the other hand, if the electric field of the light presented to the wire grid is parallel to the wires, then substantially all of the light is reflected, likewise subject to the efficiency limits of the wire grid polarizer. If any other polarization state, including random, is presented to the wire grid then that electric field is resolved or decomposed into its two orthogonal components, and the magnitude of each component is either reflected or transmitted accordingly. If the most efficiency is desired, linearly polarized light is presented to the combiner. Otherwise, some portion of the light will be reflected and some portion will be transmitted (creating visibility issues).

Therefore, if the display engine 12 does not produce linearly polarized light, and it is desired that the wire grid polarizing combiner 42 does not transmit any light (so as to provide low visibility), a polarizer 62 can be provided intermediate the display engine 12 and the display optics 44. The polarizer 62, shown in dashed lines in the figure (since it is optional), linearly polarizes the light from the display engine 12 so that the wire grid polarizing combiner 42 reflects substantially all of the light representing the synthetic image, and essentially no light representing the synthetic image is transmitted through the combiner 42 so as to give away the position of the wearer of the HMD 60.

The polarizer 62 need not be a beamsplitter, but it is preferably a wire grid polarizer. For example, if the display engine were a (MEMS microelectro-mechanical systems) display which does not produce linearly polarized light, a polarizer 62 could be used which was not a beamsplitter. However, a MEMS display does require a light engine. Thus, the HMD 60 would further require the addition of a light engine and associated illumination options.

Figure 5:
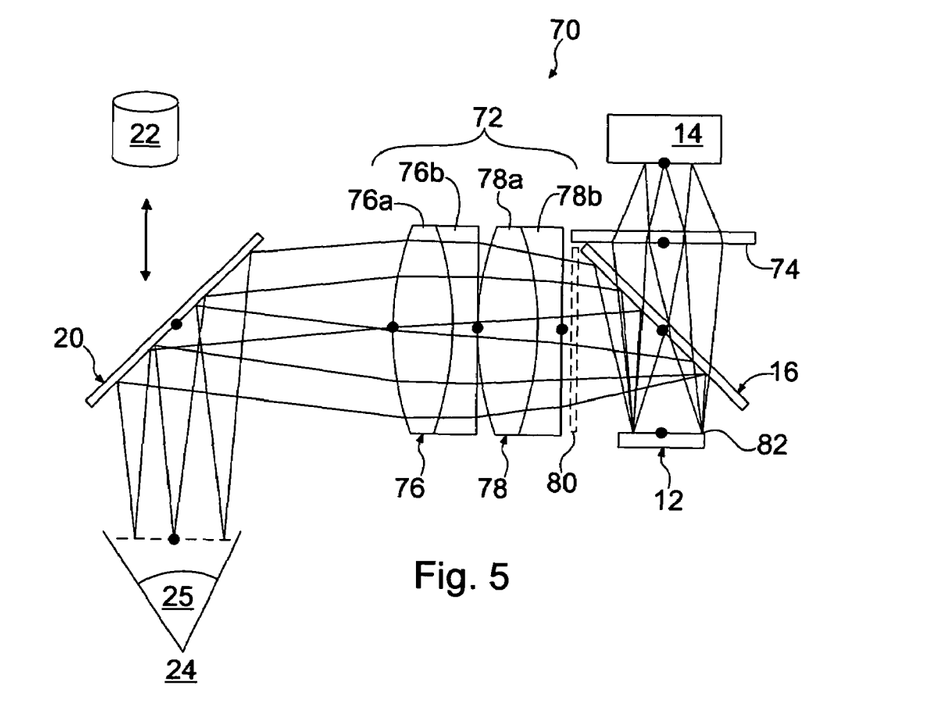
FIG. 5 is a diagram of a further alternative embodiment of a wearable display system according to the invention.

A further alternative embodiment of an HMD 70 according to the invention is illustrated in FIG. 5, and can function essentially the same as the HMD 10 shown in FIG. 1. The HMD 70 similarly comprises a display engine 12 which produces linearly polarized light defining the synthetic image, a light engine 14 which produces light to illuminate the display engine 12, a polarizing beamsplitter 16 in the path of the light produced by the light engine 14 which polarizes at least a portion of the light from the light engine 14 and reflects the polarized portion of light onto the display engine 12, display optics 72 in the path of the linearly polarized light defining the synthetic image, and a wire grid polarizing combiner 20 through which the real image 22 is contemporaneously viewable. Display optics 72 relay the linearly polarized light to the wire grid polarizing combiner 20, and the wire grid polarizing combiner 20 reflects the linearly polarized light as described previously, such that the synthetic image is overlaid onto the contemporaneously viewable real image 22.

Illumination optics 74 can also be provided to concentrate and direct the unpolarized light from the light engine 14 onto the polarizing beamsplitter 16. The light polarized by the polarizing beamsplitter 16 is reflected onto the display engine 14, which can preferably be an LCoS display, to produce polarized, spatially and temporally modulated light which defines the synthetic image. The synthetic image is relayed by the display optics 72 to the wire grid polarizing combiner 20 which reflects the image toward the pupil 25 of the eye 24 of the wearer of the HMD 70. The wire-grid polarizing combiner 20 reflects the synthetic image into the eye 24, while allowing light and images from the outside world, i.e., real images 22, to also be contemporaneously imaged by the eye 24, thus combining, or overlaying, the synthetic image onto the real image 22.

Some differences are that, in the HMD 70, the illumination optics 74 can be an optical device commonly called a Fresnel lens, and the display optics 72 can comprise image enlargement optics (a magnifier) commonly called a modified Ploessl arrangement. The modified Ploessl arrangement comprises two identical lenses 76, 78. In the arrangement illustrated, each lens is a two element doublet 76a, 76b and 78a, 78b. The modified Ploessl configuration may be chosen because of the vast amount of available stock optics which can be used to implement the arrangement. The modified Ploessl configuration also allows for a sort focal length, long eye relief and a relatively large field of view. Ploessl configurations are also characteristically insensitive to pupil shifts, which allowing a larger eye-motion box.

Moreover, an additional contrast enhancing polarizing plate 80, also termed a clean-up polarizer, can optionally be utilized between the polarizing beamsplitter 16 and the display optics 72 to eliminate unpolarized or partially polarized rays. Generally, the clean up polarizer 80 would only be used where poorer quality polarizers are used, or when extremely high light levels are used, and the extinction ratio needs to be increased. Additionally, there may be some cases in which a fiber optic face plate 82 could be used over the LCoS display to eliminate skew rays.

Although certain embodiments of the invention have been described in detail, it will be appreciated by those skilled in the art that various modifications to those details could be developed in light of the overall teaching of this disclosure. Accordingly, the particular embodiments disclosed herein are intended to be illustrative only and not limiting to the scope of the invention which should be awarded the full breadth of the following claims and any and all embodiments thereof.

What is claimed is:

1. A wearable display system which combines a synthetic image with a contemporaneously viewable real image of the outside world, said system comprising:
   a. a display engine which produces linearly polarized light defining said synthetic image;
   b. a light engine which produces light to illuminate said display engine;
   c. a polarizing beamsplitter in the path of said light produced by said light engine, said polarizing beamsplitter polarizing a portion of said light from said light engine and reflecting such polarized portion of light onto said display engine to enable said display engine to produce said linearly polarized light defining said synthetic image;
   d. display optics in the path of said linearly polarized light defining said synthetic image; and
   e. a wire grid polarizing combiner through which said real image is contemporaneously viewable, said display optics relaying said linearly polarized light to said wire grid polarizing combiner, and said wire grid polarizing combiner reflecting said linearly polarized light such that said synthetic image is overlaid onto said contemporaneously viewable real image.

2. The wearable display of claim 1 wherein said wire grid polarizing combiner is flat.

3. The wearable display of claim 1 wherein said wire grid polarizing combiner is curved in at least one axis.

4. The wearable display of claim 3 wherein said wire grid polarizing combiner is curved in two axes, having the shape of a concentric shell section of a toroid.

5. The wearable display of claim 4 wherein said display optics further comprise image aberration correction optics intermediate said display engine and said wire grid polarizing combiner, said image aberration correction optics correcting for aberrations caused due to said wire grid polarizing combiner being curved in two axes.

6. The wearable display of claim 5 wherein said image aberration correction optics further comprise:
   a. tilted and decentered lenses between said display engine and said wire grid polarizing combiner;
   b. rotational symmetric aspherical lenses intermediate said tilted and decentered lenses and said wire grid polarizing combiner; and
   c. wherein said rotational symmetric aspherical lenses pre-distorting said synthetic image in a manner which cancels out distortion caused by said wire grid polarizing combiner being curved in two axes such that said synthetic image reflected at said wire grid polarizing combiner is presented undistorted.

7. The wearable display of claim 4 wherein said wire grid polarizing combiner is a magnifier.

8. The wearable display of claim 1 wherein said linearly polarized light is one of monochrome and modulated field sequential colored light.

9. The wearable display of claim 1 wherein said light engine further comprises one of LEDs, a laser, an incandescent source, and a fluorescent source.

10. The wearable display of claim 1 wherein said display engine further comprises an LCoS display.

11. The wearable display of claim 1 wherein said beamsplitter further comprises a wire grid polarizing beamsplitter.

12. The wearable display of claim 1 further comprising illumination optics concentrating said light produced by said light engine on said beamsplitter.

13. The wearable display of claim 12 wherein said illumination optics further comprise a total internal reflection block concentrating said light from said light engine onto said polarizing beamsplitter.

14. The wearable display of claim 13 wherein said total internal reflection block further comprises a reflective off-axis parabola portion.

15. The wearable display of claim 13 wherein said light directing member further comprises a Fresnel lens.

16. The wearable display of claim 15 further comprising a contrast enhancing polarizer intermediate said polarizing beamsplitter and said wire grid polarizing combiner.

17. The wearable display of claim 16 wherein said contrast enhancing polarizer further comprises a contrast enhancing wire grid polarizer.

18. The wearable display of claim 1 wherein said display optics further comprise image enlargement optics.

19. The wearable display of claim 18 wherein said image enlargement optics further comprise a modified Ploessl lens arrangement.

20. The wearable display of claim 18 wherein said image enlargement optics further comprise an apochromatic eyepiece.

21. A wearable display system which combines a synthetic image with a contemporaneously viewable real image of the outside world, said system comprising:
   a. a display engine which produces light defining said synthetic image;
   b. display optics in the path of said light defining said synthetic image;
   c. a wire grid polarizing combiner through which said real image is contemporaneously viewable, said display optics relaying said light to said wire grid polarizing combiner, and said wire grid polarizing combiner reflecting said light such that said synthetic image is overlaid onto said contemporaneously viewable real image; and
   d. a polarizer intermediate said light produced by said display engine and said wire grid combiner, said polarizer linearly polarizing said light produced by said display engine, and said wire grid polarizing combiner reflecting said linearly polarized light such that said synthetic image is overlaid onto said contemporaneously viewable real image.

22. The wearable display of claim 21 wherein said display engine further comprises an OLED display engine.

23. The wearable display of claim 22 wherein said polarizer further comprises a wire grid polarizer.

24. The wearable display of claim 21 further comprising
   a. a light engine which produces additional light to illuminate said display engine; and
   b. wherein said display engine is a MEMS display engine.

25. A wearable display system which combines a synthetic image with a contemporaneously viewable real image of the outside world, said system comprising:
   a. a display engine which produces light defining said synthetic image;
   b. display optics in the path of said light defining said synthetic image;
   c. a wire grid polarizing combiner through which said real image is contemporaneously viewable, said display optics relaying said light to said wire grid polarizing combiner, and said wire grid polarizing combiner reflecting said light such that said synthetic image is overlaid onto said contemporaneously viewable real image;
   d. said light produced by said display engine is linearly polarized light;
   e. a light engine which produces additional light to illuminate said display engine;
   f. a polarizing beamsplitter in the path of said additional light, said polarizing beamsplitter polarizing a portion of said additional light and reflecting such polarized portion of additional light onto said display engine to enable said display engine to produce said linearly polarized light defining said synthetic image;
   g. said display optics conveying said linearly polarized light to said wire grid polarizing combiner; and
   h. said wire grid polarizing combiner reflecting said linearly polarized light such that said synthetic image is overlaid onto said contemporaneously viewable real image.

26. The wearable display of claim 25 wherein said wire grid polarizing combiner is flat.

27. The wearable display of claim 25 wherein said wire grid polarizing combiner is curved in at least one axis.

28. The wearable display of claim 27 wherein said wire grid polarizing combiner is curved in two axes, having the shape of a concentric shell section of a toroid.

29. The wearable display of claim 28 wherein said display optics further comprise image aberration correction optics intermediate said display engine and said wire grid polarizing combiner, said image aberration correction optics correcting for aberrations caused due to said wire grid polarizing combiner being curved in two axes.

30. The wearable display of claim 29 wherein said image aberration correction optics further comprise:
   a. tilted and decentered lenses between said display engine and said wire grid polarizing combiner;
   b. rotational symmetric aspherical lenses intermediate said tilted and decentered lenses and said wire grid polarizing combiner; and
   c. wherein said rotational symmetric aspherical lenses predistorting said synthetic image in a manner which cancels out distortion caused by said wire grid polarizing combiner being curved in two axes such that said synthetic image reflected at said wire grid polarizing combiner is presented undistorted.

31. The wearable display of claim 28 wherein said wire grid polarizing combiner is a magnifier.

32. The wearable display of claim 25 wherein said linearly polarized light is one of monochrome and modulated field sequential colored light.

33. The wearable display of claim 25 wherein said light engine further comprises one of LEDs, a laser, an incandescent source, and a fluorescent source.

34. The wearable display of claim 25 wherein said display engine further comprises an LCoS.

35. The wearable display of claim 25 wherein said beamsplitter further comprises a wire grid polarizing beamsplitter.

36. The wearable display of claim 25 further comprising illumination optics concentrating said light produced by said light engine on said beamsplitter.

37. The wearable display of claim 36 wherein said illumination optics further comprise a total internal reflection block concentrating said light from said light engine onto said polarizing beamsplitter.

38. The wearable display of claim 37 wherein said total internal reflection block further comprises a reflective off axis parabola portion.

39. The wearable display of claim 37 wherein said light directing member further comprises a Fresnel lens.

40. The wearable display of claim 39 further comprising a contrast enhancing polarizer intermediate said polarizing beamsplitter and said wire grid polarizing combiner.

41. The wearable display of claim 40 wherein said contrast enhancing polarizer further comprises a contrast enhancing wire grid polarizer.

42. The wearable display of claim 39 further comprising a fiber optic faceplate adjacent said display engine.

43. The wearable display of claim 25 further comprising display optics intermediate said polarizing beamsplitter and said wire grid polarizing combiner, said display optics transmitting said linearly polarized light defining said synthetic image to said wire grid polarizing combiner.

44. The wearable display of claim 43 wherein said display optics further comprise image enlargement optics.

45. The wearable display of claim 44 wherein said image enlargement optics further comprise a modified Ploessl lens arrangement.

46. The wearable display of claim 44 wherein said image enlargement optics further comprise an apochromatic eyepiece.

* * * * *